United States Patent
Kyker et al.

(10) Patent No.: US 6,711,669 B2
(45) Date of Patent: *Mar. 23, 2004

(54) SYSTEM AND METHOD FOR STORING IMMEDIATE DATA

(75) Inventors: Alan B. Kyker, Portland, OR (US); Per Hammarlund, Hillsboro, OR (US); Chan Lee, Portland, OR (US); Robert F. Krick, Fort Collins, CO (US); Hitesh Ahuja, Portland, OR (US); William Alexander, Hillsboro, OR (US); Joseph Rohlman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/339,571

(22) Filed: Jan. 10, 2003

(65) Prior Publication Data

US 2003/0101209 A1 May 29, 2003

Related U.S. Application Data

(60) Continuation of application No. 09/984,525, filed on Oct. 30, 2001, which is a division of application No. 09/223,299, filed on Dec. 30, 1998, now Pat. No. 6,338,132.

(51) Int. Cl.[7] ............................................. G06F 9/00
(52) U.S. Cl. ..................................... 712/211; 712/213
(58) Field of Search ............................ 712/211, 213, 712/210, 208; 717/151

(56) References Cited

U.S. PATENT DOCUMENTS

| | | | | |
|---|---|---|---|---|
| 4,724,517 A | * | 2/1988 | May | 712/210 |
| 5,303,358 A | * | 4/1994 | Baum | 712/226 |
| 5,625,784 A | * | 4/1997 | Purcell | 712/209 |
| 5,745,722 A | | 4/1998 | Matsumoto et al. | |
| 5,784,585 A | * | 7/1998 | Denman | 712/210 |
| 5,819,058 A | | 10/1998 | Miller et al. | |
| 5,896,519 A | | 4/1999 | Worrell | |
| 5,915,109 A | | 6/1999 | Nakakimura et al. | |
| 6,038,657 A | | 3/2000 | Favor et al. | |
| 6,049,862 A | * | 4/2000 | Bauer et al. | 712/208 |
| 6,167,505 A | * | 12/2000 | Kubota et al. | 712/210 |
| 6,253,314 B1 | * | 6/2001 | Itoh | 712/226 |
| 6,338,132 B1 | * | 1/2002 | Kyker | 712/213 |
| 6,564,314 B1 | * | 5/2003 | May et al. | 712/210 |

* cited by examiner

Primary Examiner—Larry D. Donaghue
(74) Attorney, Agent, or Firm—Kenyon & Kenyon

(57) ABSTRACT

An article comprising an instruction stored on a storage medium. The instruction includes opcode field storing an opcode signal and an operand field storing an operand signal. The operand is compressed prior to being stored in the operand field.

8 Claims, 9 Drawing Sheets

FIG.1 PRIOR ART
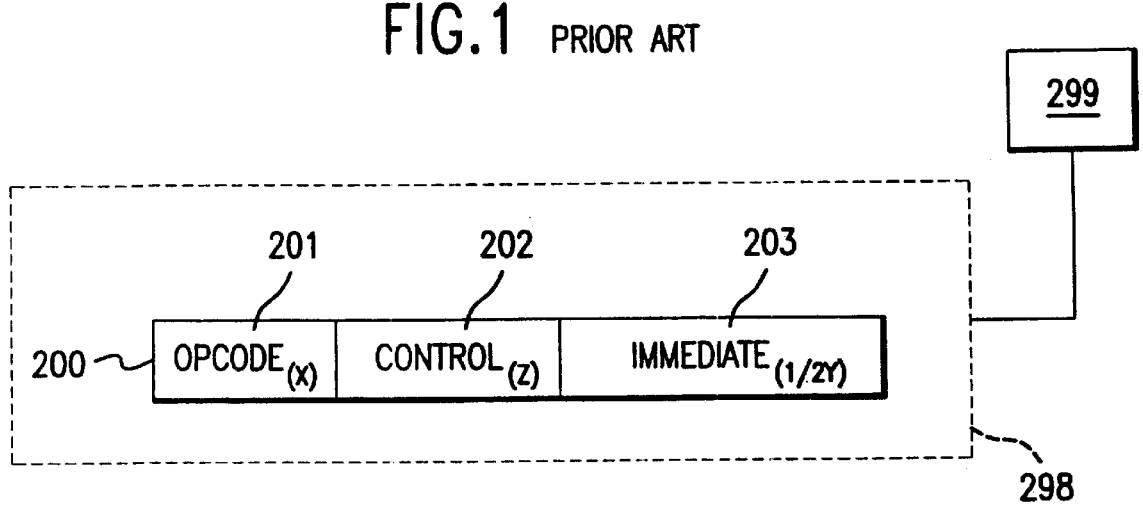
FIG.2
| 300 | 00 | SIGN EXTENSION |
| --- | --- | --- |
| 310 | 01 | BACK SCAVENGING |
| 320 | 10 | FORWARD SCAVENGING |
| 330 | 11 | SHARING |
FIG.3

SYSTEM AND METHOD FOR STORING IMMEDIATE DATA

This application is a continuation of U.S. patent application Ser. No. 09/984,525, filed Oct. 30, 2001, which is a divisional of U.S. patent application Ser. No. 09/223,299, filed Dec. 30, 1998 (now U.S. Pat. No. 6,338,132, issued Jan. 8, 2002), each of which are incorporated herein by reference in their entireties.

FIELD

The present invention is directed to improvements in instructions to be processed in a processor.

BACKGROUND INFORMATION

Program instructions control the operation of modern microprocessors. Typically, each program instruction includes a specification of the operation to be performed, the type of operands to be manipulated, and the location of these operands. A typical instruction comprises one to several programming elements. The arrangement of these programming elements is referred to as an instruction format. There are various instruction formats to implement different functionalities for any number of different microprocessors and within a single microprocessor there may be various instruction formats based on the number and type of programming elements used to comprise each instruction.

One example microprocessor, the Intel Pentium® Pro microprocessor, recognizes various programming elements including, for example, opcodes, immediate operands, register specifiers, memory operands, scale/index/base (SIB) registers, prefixes, displacement and addressing-mode specifiers. These programming elements, either alone or in combination with other programming elements, perform a specified function when included in an instruction. For example, a register specifier specifies either a source register operand and/or a destination register operand. An example instruction comprised of (MOV A, B) is used to move a value from a source register operand (B) to a destination register operand (A).

In the above example, the programming element specifying the move function (MOV), is the opcode. The opcode specifies the operation performed by the instruction. An opcode is typically contained in each instruction, although it is not a requirement. Opcodes can specify numerous operations including, for example, moving, adding, subtracting, multiplying, dividing and storing. Some operations may have several different opcodes, each specifying a different variant of the operation, for example, an exclusive or (XOR) and a logical or (OR). Thus, by combining an opcode and one or more of the other programming elements, a complete instruction can be formed.

The processor does not understand symbolic instructions such as the example above, MOV A, B, but rather understands only bits or a series of bits. An assembler or compiler converts the symbolic instructions, usually generated using a higher level language such as the C programming language, into a long series of bits, termed binary code or machine language. In certain microprocessors, for example complex instruction set computer (CISC) processors, the instruction is further converted to a more basic unit termed a micro-op in order to be executed.

One of the programming elements listed above is an immediate operand. The immediate operand is a value included at the time of programming and is part of the program code. Unlike the example above, where the source register is the address of the value to be moved, an immediate operand is the actual value on which the operation specified by the opcode is to be performed. For example, a symbolic instruction of (MOV A, 512) is used to move the value 512 to a destination register operand (A).

A typical instruction or micro-op includes a fixed number of bits, regardless of the information to be stored in each instruction. FIG. 1 shows the format of an example instruction 100 in a conventional instruction format. The instruction includes an opcode field 101 and an immediate operand field 102. In this particular instruction format the opcode field 101 has a bit length of X and the immediate operand field 102 has a bit length of Y. The fixed number of bits allocated to each instruction may be determined by the maximum number of bits employed for each of the above listed programming elements. For example, the maximum number of bits for the opcode is known because the number of operations specified by the opcode is fixed. For example, if 6 bits are designated for the opcode field 101, there can be a maximum of $2^6$ or 64 operations specified by the opcode, and each of these operations will be represented by a unique combination of the 6 bits. The fixed length of the bits (Y) allocated to the immediate operand field 102 is normally equal to the size of the maximum immediate operand that will occur in any instruction. For example, if the maximum immediate operand is 32 bits in length, each instruction will have a fixed length of 32 bits assigned for the immediate operand, regardless of whether 32 bits are employed for that particular instruction. Thus, each and every instruction formatted in the above described instruction format will have 6 bits allocated to the opcode field 101 and 32 bits allocated to the immediate operand field 102, regardless of whether these bits are employed to express the function to be performed by the instruction.

The above described instruction or micro-op that includes an opcode and an immediate operand works reasonably well and is an efficient use of allocated bits when the immediate operand is its maximum size. However, in the case of the average instruction, there will be no immediate operand or the immediate operand will employ less bits than the number of allocated bits. In this average case, the bits assigned to the immediate operand are wasted because the remainder of the allocated bits are unused. This was not a problem in previous implementations because the processor was only holding a few instructions or micro-ops at any given time, however modern processors can hold thousands of instructions or micro-ops causing the space employed by these instructions to become substantial.

SUMMARY

An article comprising an instruction stored on a storage medium. The instruction includes opcode field storing an opcode signal and an operand field storing an operand signal. The operand is compressed prior to being stored in the operand field.

BRIEF DESCRIPTION OF THE DRAWINGS

FIG. 1 shows an example instruction including an opcode field and an immediate operand field.

FIG. 2 shows an example instruction according to the present invention, including an opcode field, a control field and an immediate operand field.

FIG. 3 shows an example table of immediate operand compression schemes according to the present invention.

FIG. 4a shows an example instruction in the instruction format of FIG. 1.

FIG. 4b shows the example instruction of FIG. 4a compressed into the instruction format of FIG. 2 using an example of sign extension compression according to the present invention.

DETAILED DESCRIPTION

Figure 5A:
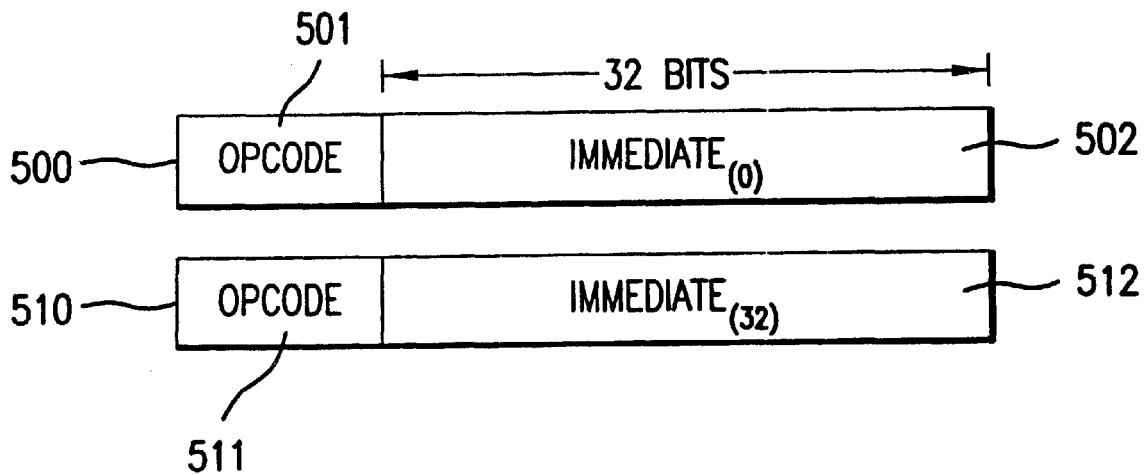
FIG. 5a shows two example instructions in the instruction format of FIG. 1.

Embodiments of the present invention can be applied to any level of the program instruction, e.g., opcode, binary code, etc., thus, when using the term instruction throughout this specification it should be understood that it is not limited to any particular type of instruction. Likewise, throughout this specification the term immediate operand is used to describe an example type of instruction data that can be implemented using the present invention. Again, it should be understood that this is only an example, and any type of instruction operand can be used with the present invention.

FIG. 2 shows an example instruction 200, according to the present invention. The example instruction 200 is stored on a storage medium 298 as magnetic, electric, or optical signals, for example. (Of course, the example instruction 200 may be stored in other forms, depending on, for example, the type of storage medium utilized). The storage medium may be, for example, a memory device such as a random access memory device (RAM), a read-only memory device (ROM), cache memory, flash memory, a floppy or hard disk, a compact disk, magnetic tape, an optical disk, etc. Other types of storage media may also be used. The instruction may be read from the storage medium and processed by, for example, a processor 299.

The instruction 200 includes an opcode field (storing an opcode signal) 201, a control field (storing control information signals) 202 and an immediate operand field (storing an immediate operand signal) 203. In this instruction, the opcode field 201 has a bit length of X, the control field 202 has a bit length of Z and the immediate operand field 203 has a bit length of ½Y. The present invention is not limited by the exact number of bits X, ½Y, and Z assigned to the opcode field 201, the immediate operand field 203, and the control field 202, respectively, because the present invention can be implemented independent of any particular allocated bit length for these fields. The following describes a compressed immediate operand field that is one half the size of the original immediate operand field. Those skilled in the art will understand that the described compression techniques can be adapted for use in any size compressed immediate operand field, for example one-third or one-quarter the size of the original immediate operand field. Additionally, the instruction format illustrated in FIG. 2 is a simplified example instruction and may contain other fields for other programming elements, for example, a prefix.

An example instruction according to the present invention allocates both a minimum number of bits and a fixed number of bits to the immediate operand field 203. For example, a number of bits allocated to the immediate operand field 203 may be one half the size of the maximum immediate operand, i.e., ½Y. For example, if the size of the maximum immediate operand (Y) is 32 bits, (½Y) 16 bits may be allocated to the immediate operand field 203 in the instruction format of FIG. 2. By making the bits allocated to the immediate operand field 203 one half the size of the maximum immediate operand, it is possible, through the use of compression techniques, to fit all the immediate operands into the space allocated to the immediate operand field 203, including those immediate operands larger than one half the size of the maximum immediate operand. Therefore, the instruction format illustrated in instruction 200 is an improved format than the instruction format illustrated in instruction 100 because the size of the immediate operand remains fixed, but this size is reduced by half.

There are several compression techniques that can be used to reduce an immediate operand that is larger than one half the size of the maximum immediate operand. These compression techniques include, for example, sign extending, back scavenging, forward scavenging and sharing, all of which will be described in greater detail below. Of course, other compression techniques may be utilized. These compression techniques may be performed, for example, because when executing any instruction, the processor is capable of reading an immediate operand for the instruction to be executed from either the previous or next instruction. Second, an immediate operand can be compressed because the number of significant bits employed to represent the immediate operand is less than the number of bits allocated to the immediate operand.

The signals (e.g., bits) stored in the control field 202 in example instruction format illustrated by instruction 200 controls the immediate operand by specifying whether immediate operand compression is to be used and which compression technique to use. FIG. 3 shows an example table of permutations for an example control function containing 2 bits. For example, row 300, having control field bits 00 specifies that the immediate operand is compressed by sign extending. Row 310, having control field bits 01, specifies that the immediate operand is be compressed by back scavenging. Row 320, having control field bits 10, specifies that the immediate operand is compressed by forward scavenging, and row 330, having control field bits 11, specifies that the immediate operand is compressed by sharing. Based on the specification of the control bit the appropriate immediate operand compression is performed. Of course, this example is limited to 2 control bits, when in reality there could be further reduction functions and combinations of reduction functions that can be performed. Those skilled in the art will understand that the control field is optional in the instruction format according to the present invention. For example, if the same compression technique is used for all instructions, the control field may not be employed.

The following is a description of the various compression techniques that can be used to compress an immediate operand according to the present invention. In these descriptions of the compression techniques, reference is made to instructions, but it should be understood that this reference is equally applicable to a full line of programming code, an individual micro-op, or any other subpart of a programming instruction. Instructions are stored with their full immediate operand and compressed for processing by an instruction pipeline or processor. The compression techniques may be performed by the processor prior to execution of the instruction. However, these compression techniques may also be performed at different stages of program processing (by software or hardware), for example, during the translation from higher level language to machine language by the compiler or assembler, or during an instruction decode phase in the instruction pipeline.

Sign Extension: Sign extension is commonly used to extend a smaller integer value into a larger integer value by padding the extra bits. For example, a 16 bit signed integer (bits 0–15) can be extended to a 32 bit signed integer by padding the new bits, bits 16–31, using the sign bit value. In the case of a 16 bit negative integer, the sign bit, bit 15, would have a bit value of 1, thus to extend the 16 bit negative integer to a 32 bit negative integer, bits 16–31 would be padded with the sign bit value of 1. Unsigned integers, on the other hand, are extended to the new size by filling all the newly arising bits with Os. This technique is helpful in working with immediate operands, because as described above, in prior art instruction formats the immediate operand field is generally the size of the maximum immediate operand. Thus, in the average case where the number of bits employed to represent the value of the immediate operand is significantly less than the maximum number of bits, the immediate operand is extended to fill the allocated number of bits.

Figures 4A, 4B:
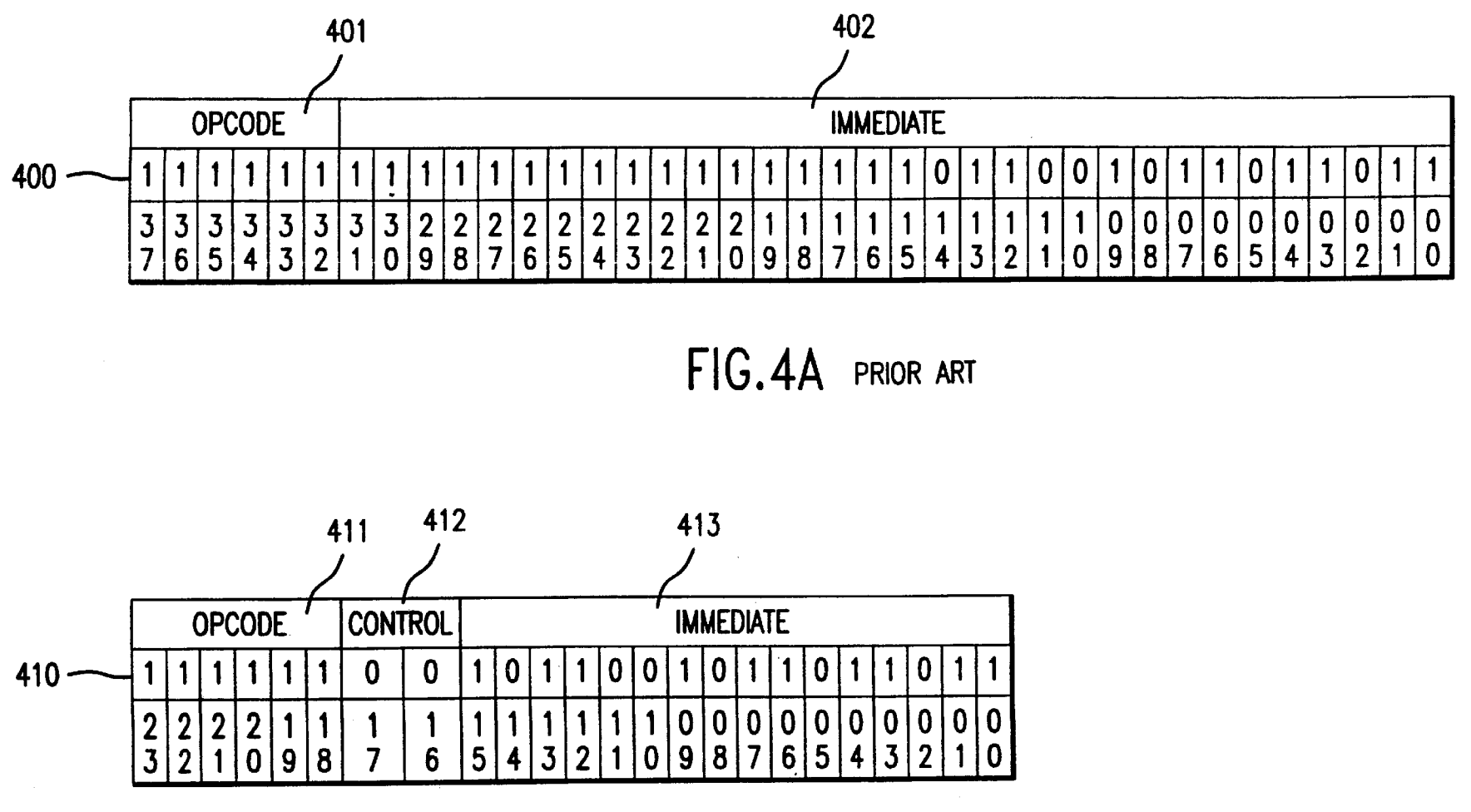

Sign extension can also be used to compress the immediate operand into a less extensive format because the number of bits needed to represent the value of the immediate operand is less than the number of bits allocated to the immediate operand field. Specifically, if the number of bits employed to represent the immediate operand is less than or equal to half the size of the number of bits allocated to the immediate operand, the immediate operand can be compressed using sign extension, into the improved instruction format of FIG. 2. An example of sign extension will be described with reference to FIGS. 4*a* and 4*b*.

FIG. 4*a* shows an example instruction 400, in the instruction format of FIG. 1, having 6 bits (bits 32–37) allocated to opcode field 401 and 32 bits (bits 0–31) allocated to the immediate operand field 402. The immediate operand bits represent the integer value (−19,749) in sign extended two's complement representation. As can be seen from FIG. 4*a*, the integer value (−19,749) can be represented by using only 16 bits, leaving immediate operand field 402 bits 16–31 as insignificant. However, because the number of bits allocated to the immediate operand field 402 is fixed, the processor is still employed to read all 32 bits in the immediate operand field 402. However, since the number of bits needed to represent the value of the immediate operand is less than or equal to half the number of bits allocated to the immediate operand field 402, it is possible, using sign extension, to represent the same instruction in the instruction format of FIG. 2, where the number of bits allocated to the immediate operand field can be reduced by half.

FIG. 4*b* shows such an example instruction 410, in the instruction format of FIG. 2, having 6 bits (bits 18–23) allocated to opcode field 411, 2 bits (bits 16–17) allocated to control field 412 and 16 bits (bits 0–15) allocated to the immediate operand field 413. The example instruction 410 of FIG. 4*b* accomplishes the same function as the example instruction 400 of FIG. 4*a*, using 14 fewer bits because the immediate operand is compressed using sign extension. In FIG. 4*b*, the immediate operand again represents the integer value (−19,749), which can be represented using 16 bits (bits 0–15).

The sign extension compression for the immediate operand from FIG. 4*a* to FIG. 4*b* works in the following manner. The bits allocated to the opcode fields 401, 411 remain the same in both figures. In FIG. 4*b*, the control field 412 is included in the instruction format, and the number of bits allocated to the immediate operand field 413 in FIG. 4*b* is half the number allocated to immediate operand field 402 in FIG. 4*a*. In FIG. 4*b*, the control field bit value of 00 specifies that the 32 bit immediate operand is going to be compressed using sign extension into a 16 bit immediate operand. As described above, the control field 412 is not a requirement of the instruction format according to the present invention. The processor when executing the instruction 410 will recognize that the immediate operand contained in the immediate operand field 412 is only a 16 bit value. Thus when interpreting the immediate operand bit code, the processor will assign the same value (−19,749) as if it were decoding the 32 bit immediate operands in FIG. 4*a*.

Back Scavenging: Back scavenging allows an immediate operand to be compressed because the immediate operand or a portion of the immediate operand for a current instruction can be stored in the previous instruction. An example of back scavenging will be described with reference to FIGS. 5*a* and 5*b*.

FIG. 5*a* shows an example portion of a program containing two instructions 500–510 in the format described with respect to FIG. 1. For each instruction, in the example instructions 500–510 of FIG. 5*a*, there are a fixed number of bits allocated to the opcode fields 501, 511 and a fixed number of bits allocated to the immediate operand fields 502, 512. In this example, 32 bits are allocated to the immediate operand fields 502, 512 based upon the fact that 32 bits is the maximum immediate operand any individual instruction is expected to hold. Each instruction of FIG. 5*a*, shows the number of significant bits employed to represent the immediate operand of the instruction. Instruction 500 does not contain any immediate operand, thus none of the 32 bits allocated to immediate operand field 502 are used in this instruction. However, as described above, the processor still reads these bits because in this instruction format every instruction has the same 32 bits allocated to the immediate operand field 502, regardless of whether any particular instruction employs the allocated space. Instruction 510 contains an immediate operand employing all of the 32 bits allocated to the immediate operand field 512.

Figure 5B:
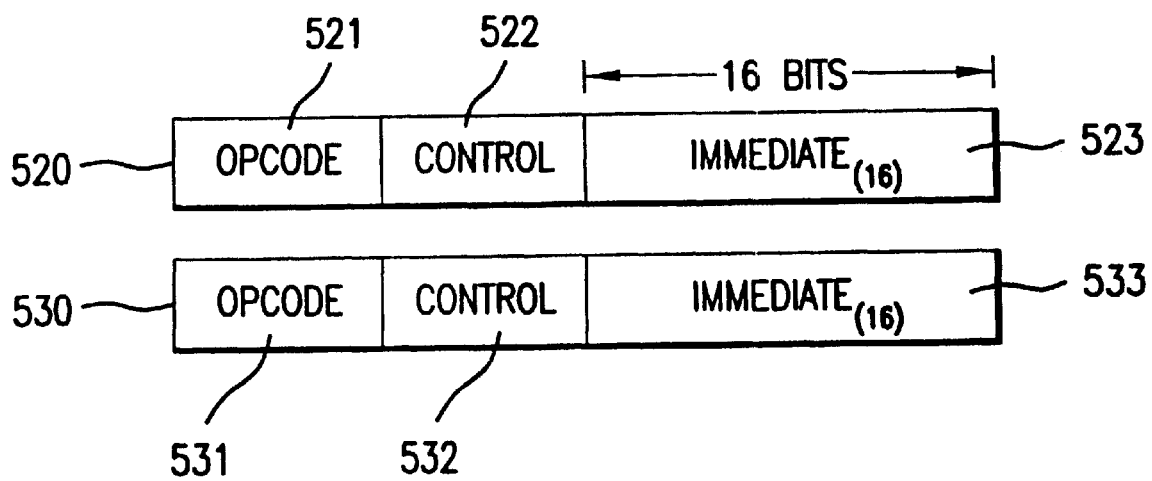
FIG. 5b shows the example instructions of FIG. 5a compressed into the instruction format of FIG. 2 using an example of back scavenging compression according to the present invention.

FIG. 5*b* shows the same portion of a program as FIG. 5*a*, except that the instructions 520–530 are in the instruction format of FIG. 2, after the immediate operand from instruction 510 has been compressed using back scavenging. Again, the format of the example instructions 520–530 have a fixed number of bits allocated to the opcode fields 521, 531, the control fields 522, 532 and the immediate operand fields 523, 533. The fixed number of bits allocated to the immediate operand fields 523, 533 is 16 bits, half of the number of bits allocated to the immediate operand fields 502, 512 in the instructions 500–510 of FIG. 5a. The back scavenging compresses the 32 bit immediate operand in the following manner. The processor recognizes that the immediate operand for instruction 510 employs 32 bits to represent its value, and also that there is no immediate operand in instruction 500. Therefore, the processor can store the immediate operand or a portion of the immediate operand of instruction 510 in the empty space in instruction 500. In this particular case, since 32 bits are employed to represent the immediate operand of instruction 510, the processor accomplishes this compression by splitting the 32 bit immediate operand associated with instruction 510 in half. FIG. 5b shows the results of this compression, with 16 bits of the immediate operand stored in the immediate operand field 523 of the previous instruction 520 and 16 bits of the immediate operand stored in the immediate operand field 533 of the current instruction 530.

The signals stored in control fields 522, 532 may be used to inform the processor that back scavenging is taking place. For example, the signals stored in the control field 522 of instruction 520 can inform the processor that the value stored in the immediate operand field 523 is not a portion of the current instruction 520 and should be ignored when executing the line. The signals stored in control field 532 of instruction 530 can inform the processor that the value stored in the immediate operand field 533 is not the complete immediate operand for that instruction. Thus, half of the immediate operand is stored in the previous instruction 520. The processor, when executing instruction 530, will read the 16 bit immediate operands stored in the immediate operand fields 523, 533 of instructions 520–530 as a single 32 bit immediate operand for instruction 530. Thus, through the use of back scavenging the 32 bits allocated to the immediate operand in instructions 500–510 in FIG. 5a can be reduced to 16 bits in instructions 520–530 in FIG. 5b, while the instructions accomplish the same or a similar function.

Forward Scavenging: Forward scavenging allows an immediate operand to be compressed because the immediate operand or a portion of the immediate operand for a current instruction can be stored in the next instruction in a sequence of instructions. An example of forward scavenging will be described with reference to FIGS. 6a and 6b.

Figure 6A:
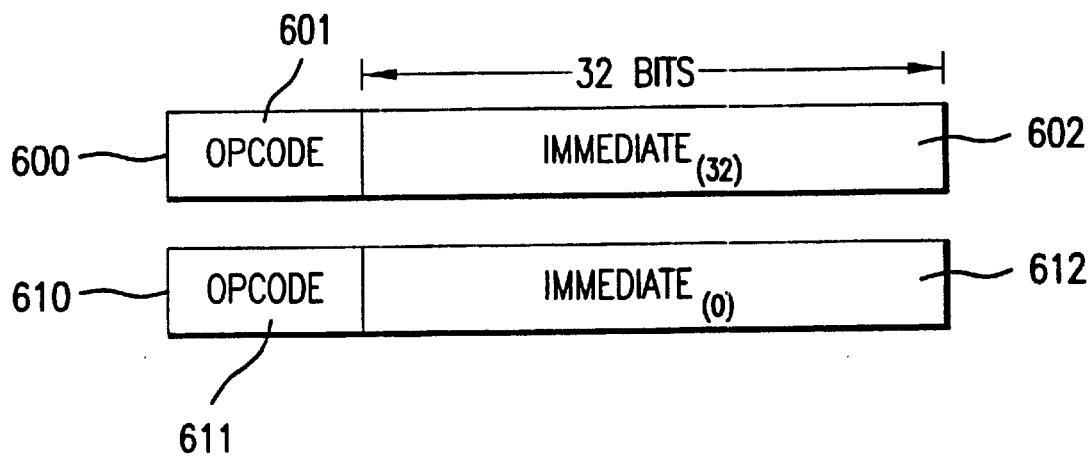
FIG. 6a shows two example instructions in the instruction format of FIG. 1.

FIG. 6a shows an example portion of a program containing two instructions 600–610 in the format described with respect to FIG. 1. For each instruction, in the example instructions 600–610 of FIG. 6a, there are a fixed number of bits allocated to the opcode fields 601, 611 and a fixed number of bits allocated to the immediate operand fields 602, 612. In this example, 32 bits are allocated to the immediate operand fields 602, 612 based upon the fact that 32 bits is the maximum immediate operand any individual instruction is expected to hold. Each instruction of FIG. 6a, shows the number of significant bits employed to represent the immediate operand of the instruction. Instruction 600 contains an immediate operand employing all of the allocated 32 bits, while instruction 610 does not contain any immediate operand.

Figure 6B:
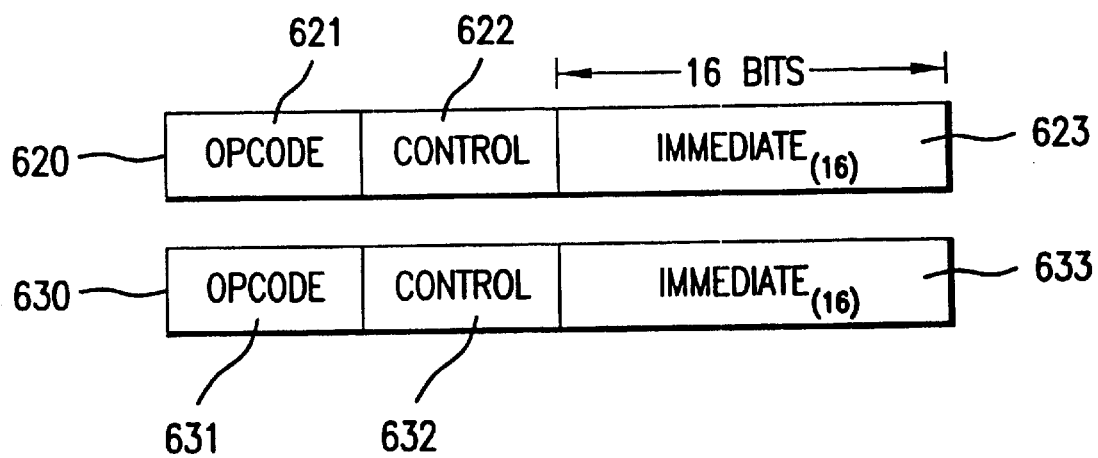
FIG. 6b shows the example instructions of FIG. 6a compressed into the instruction format of FIG. 2 using an example of forward scavenging compression according to the present invention.

FIG. 6b shows the same portion of a program as FIG. 6a, except that the instructions 620–630 are in the instruction format of FIG. 2, after the immediate operand from instruction 600 has been compressed using forward scavenging. Again, the format of the example instructions 620–630 have a fixed number of bits allocated to the opcode fields 621, 631, the control fields 622, 632 and the immediate operand fields 623, 633. The fixed number of bits allocated to the immediate operand fields 623, 633 is 16 bits, half of the number of bits allocated to the immediate operand fields 602, 612 in the instructions 600–610 of FIG. 6a. Forward scavenging compresses the 32 bit immediate operand in the following manner. The processor recognizes that the immediate operand for instruction 600 employs 32 bits to represent its value, and also that there is no immediate operand in instruction 610. Therefore, the processor can store the immediate operand or a portion of the immediate operand of instruction 600 in the vacant immediate operand field 612 of instruction 610. In this particular case, since 32 bits are employed to represent the immediate operand of instruction 600, the processor accomplishes this compression by splitting the 32 bit immediate operand associated with instruction 600 in half. FIG. 6b shows the results of this compression, with 16 bits of the immediate operand stored in the immediate operand field 623 of the current instruction 620 and 16 bits of the immediate operand stored in the immediate operand field 633 of the next instruction 630.

The signals stored in control fields 622, 632, although not necessarily employed as described above, may be used to inform the processor that forward scavenging is taking place. For example, the signals stored in control field 622 of instruction 620 can inform the processor that the value stored in the immediate operand field 623 is not the complete immediate operand for that instruction, half of the immediate operand is stored in the immediate operand field 633 of the next instruction 630. The control portion of instruction 630 can inform the processor that the value stored in the immediate operand field 633 is not a portion of the current instruction and should be ignored when executing instruction 630. The processor, when executing instruction 620, will read the 16 bit immediate operands stored in the immediate operand fields 623, 633 of instruction 620–630 as a single 32 bit immediate operand for instruction 620. Thus, through the use of forward scavenging, the 32 bits allocated to the immediate operand fields 602, 612 in instructions 600–610 in FIG. 6a can be reduced to 16 bits in instructions 620–630 in FIG. 6b, while the instructions accomplish the same or a similar function.

Sharing: Sharing allows an immediate operand to be compressed because two instructions have the same immediate operand, or a portion of the immediate operand bit pattern for the two instructions are the same. An example of sharing will be described with reference to FIGS. 7a and 7b.

Figure 7A:
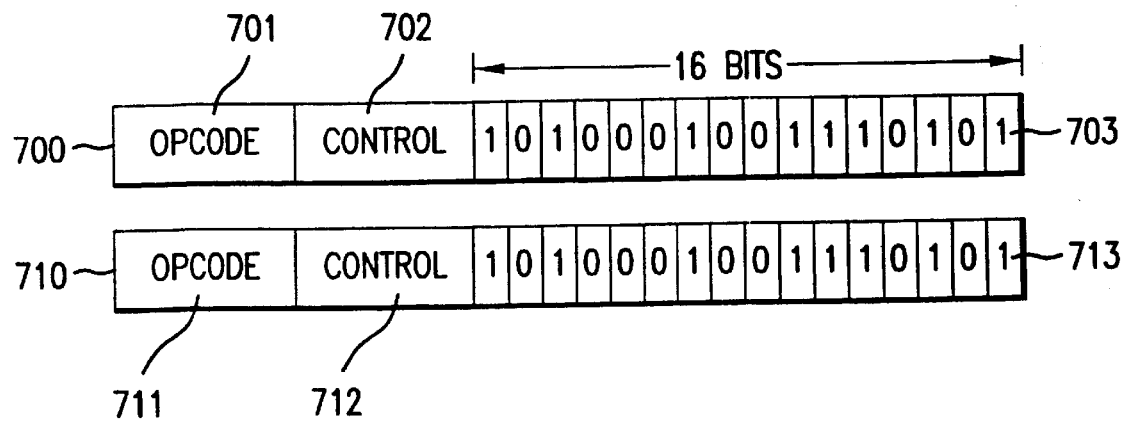
FIG. 7a shows two example instructions in the instruction format of FIG. 2.

FIG. 7a shows an example portion of a program containing two instructions 700–710 that are in the instruction format of FIG. 2 including the opcode fields 701, 711, the control fields, 702, 712, and the immediate operand fields 703, 713. In this example program portion, the immediate operands have previously been compressed using sign extension, resulting in an example 16 bit immediate operand for each of the instructions 700–710. There is no specific requirement that sign extension be performed on the immediate operand prior to compression by sharing. For sharing, the bit patterns stored in the allocated immediate operand fields for two consecutive instructions should be identical. As can be seen in FIG. 7a, instructions 700–710 include identical bit patterns in the allocated immediate operand fields, and therefore compression of the immediate operands by sharing may be performed easily.

Figure 7B:
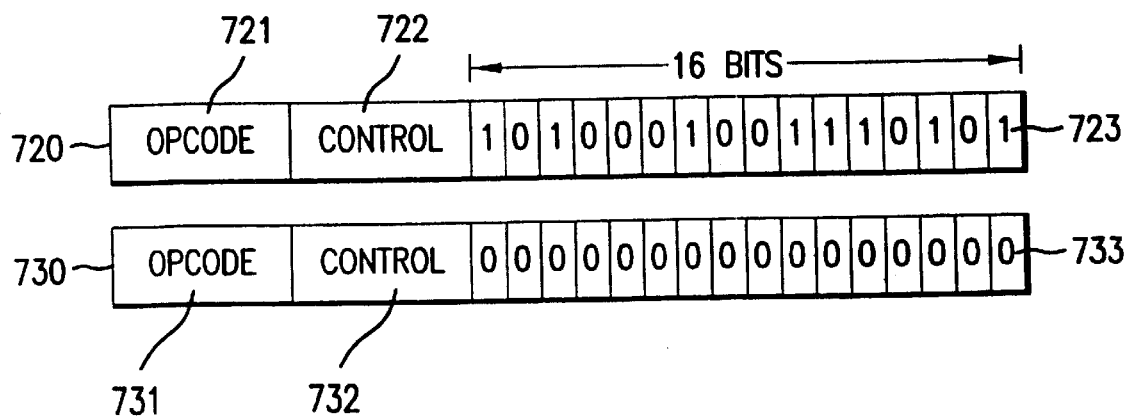
FIG. 7b shows the example instructions of FIG. 7a compressed into the instruction format of FIG. 2 using an example of sharing compression according to the present invention.

FIG. 7b shows the same portion of the program as FIG. 7a after the immediate operands of instructions 700–710 have been compressed by sharing, resulting in instructions 720–730. The immediate operand stored in immediate operand field 723 of instruction 720 of FIG. 7b remains the same as the immediate operand stored in immediate operand field 703 of instruction 700 of FIG. 7a. The immediate operand field 733 of instruction 730 becomes empty because it will share the immediate operand with instruction 720. The control fields 722, 732 can be used to inform the processor that two instructions 720–730 share immediate operands. For example, the signals stored in control field 722 of instruction 720 can inform the processor that the immediate operand stored in the immediate operand field 723 is to be used while executing this instruction. The signals stored in control field 732 of instruction 730 can inform the processor that the instruction employs an immediate operand even though there is no immediate operand stored in the immediate operand field 733 of the instruction 730. The signals stored in control field 732 can further inform the processor that the immediate operand for instruction 730 is stored in the immediate operand field 723 of instruction 720. Thus, when executing instruction 730 the processor will use the immediate operand stored in the immediate operand field 723 of instruction 720.

In this manner, two instructions can share an immediate operand stored in only one instruction. The advantage of this sharing is that the immediate operand field in the second instruction becomes empty, making it possible for that second instruction to be involved in another compression scheme for the next instruction. For example, if an instruction followed instruction 730, and this next instruction employed back scavenging to reduce its immediate operand, the immediate operand field 733 of instruction 730 would be available to handle the back scavenging for the next instruction.

The above example of sharing shows that the common immediate operand for two instructions stored in the first of the two instructions, however, it should be understood that the common immediate operand can just as easily be stored in the second instruction, thus creating an empty immediate operand field in the first instruction.

The above described methods of compressing the immediate operand, can also be combined to form other methods of compression. The above example of sharing explained with reference to FIGS. 7a and 7b, showed that sign extension and sharing can be combined to compress the immediate operand of two instructions. Additionally, other combinations can be used including, for example, sign extension/back scavenging, sign extension/forward scavenging, forward scavenging/sharing and back scavenging/sharing. An example of one such combination, sign extension/back scavenging, will be explained with reference to FIGS. 8a–8c.

Figure 8A:
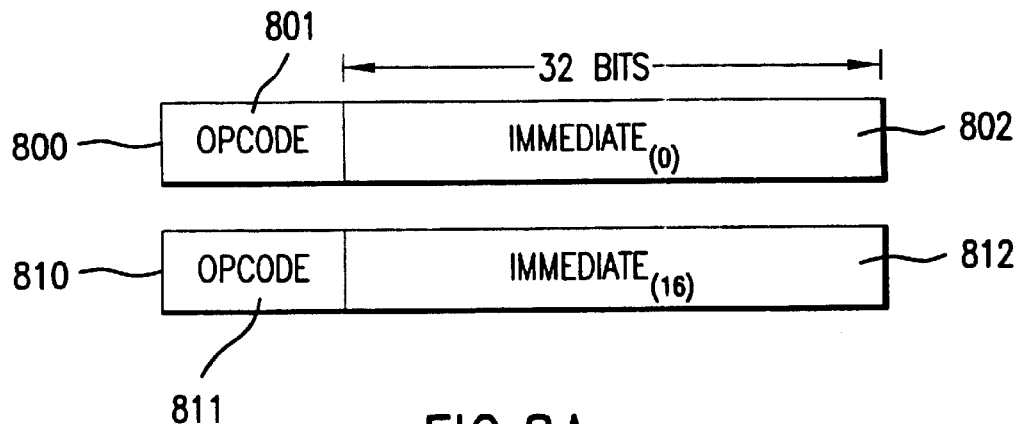
FIG. 8a shows two example instructions in the instruction format of FIG. 1.

FIG. 8a shows an example portion of a program containing two instructions 800–810 in the format described with respect to FIG. 1. Each of instructions 800–810 includes an opcode field 801, 811 and an immediate operand field 802, 812. The immediate operand fields 802, 812 are allocated a fixed number of 32 bits. Each instruction 800–810 of FIG. 8a, shows the number of significant bits employed to represent the immediate operand of the instruction.

Instruction 800 does not contain any immediate operand, thus none of the allocated 32 bits are employed for this instruction, while instruction 810 contains an immediate operand that can be represented by only 16 bits of the allocated 32 bits.

Figure 8B:
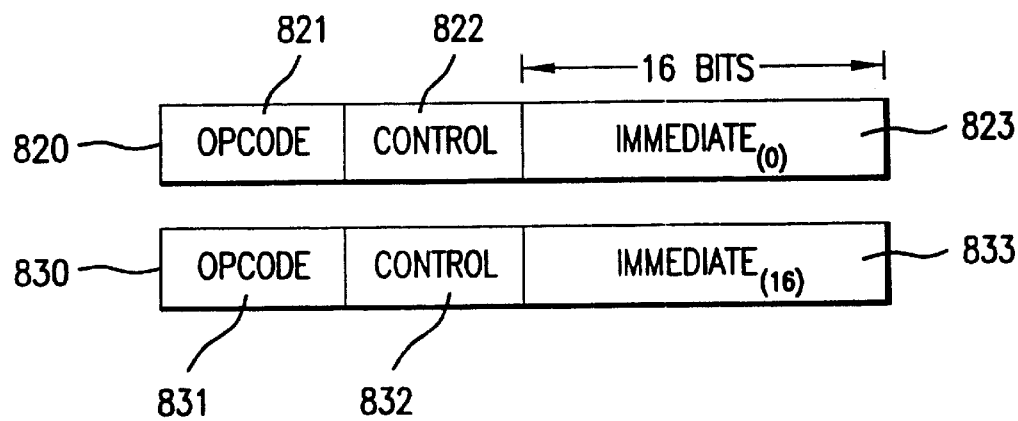
FIG. 8b shows the first stage of immediate operand compression of the example instructions of FIG. 8a using an example of sign extension/back scavenging compression according to the present invention.

FIG. 8b shows the same portion of the program as FIG. 8a after instructions 800–810 have been reformatted into the instruction format of FIG. 2, and the immediate operand of instruction 810 has been compressed by sign extension, resulting in instructions 820–830. Instructions 820–830 include opcode fields 821, 831, control fields 822, 832 and immediate operand fields 823, 833. In instructions 820–830, there are a fixed 16 bits allocated to the immediate operand fields 823, 833. As explained above with reference to sign extension, it is possible to store the immediate operand of instruction 810 in the 16 bits of immediate operand field 833 of instruction 830, rather than the 32 bit immediate operand field 812 of instruction 810, since the immediate operand can be represented by 16 or less bits.

Figure 8C:
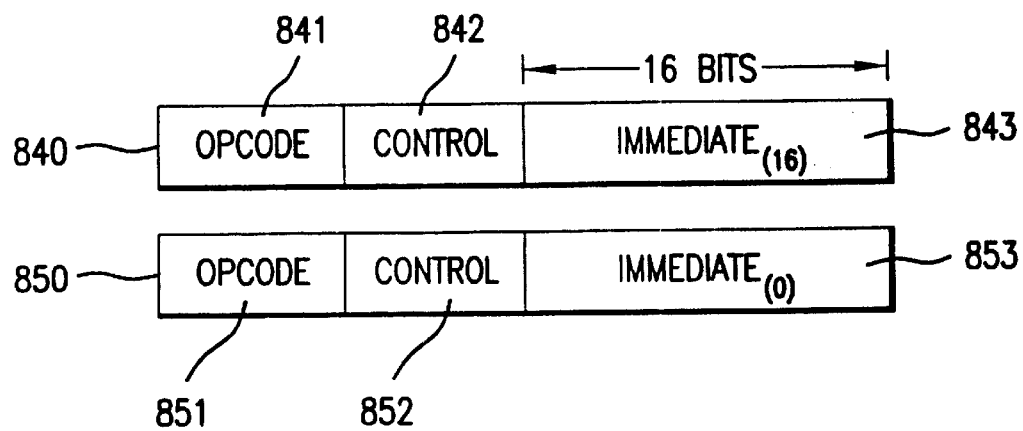
FIG. 8c shows the complete immediate operand compression of the example instructions of FIG. 8a using sign extension/back scavenging compression according to the present invention.

FIG. 8c shows the same portion of the program as FIGS. 8a and 8b after the instructions have been subject to a further compression of back scavenging, resulting in instructions 840–850. Instructions 840–850 include opcode fields 841, 851, control fields 842, 852 and immediate operand fields 843, 853. This example of back scavenging is slightly different than the example previously described. In this case, since the immediate operand has been compressed to 16 bits by sign extension, there is no need to split the immediate operand in half, the entire 16 bit immediate operand for instruction 850 can be stored directly in the immediate operand field 843 of instruction 840.

The signals stored in control fields 842, 852 can be used to inform the processor that sign extension/back scavenging is taking place. For example, the signals stored in control field 842 of instruction 840 can inform the processor that the value stored in the immediate operand field 843 is not a portion of the current instruction and should be ignored when executing instruction 840. Whereas, the signals stored in control field 852 of instruction 850 can inform the processor that even though there is no value stored in the immediate operand field 853, an immediate operand is employed for the execution of instruction 850. The processor when executing instruction 850 will read the 16 bit immediate operand stored in the immediate operand field 843 of instruction 840 as a 16 bit immediate operand for instruction 850. Thus, through the use of sign extension/back scavenging the 32 bits allocated to the immediate operand fields 802, 812 in instructions 800–810 in FIG. 8a can be reduced to 16 bits in instruction 840–850 in FIG. 8c, while also freeing the immediate operand field 853 in instruction 850 for any compression employed on the next instruction.

Figure 9A:
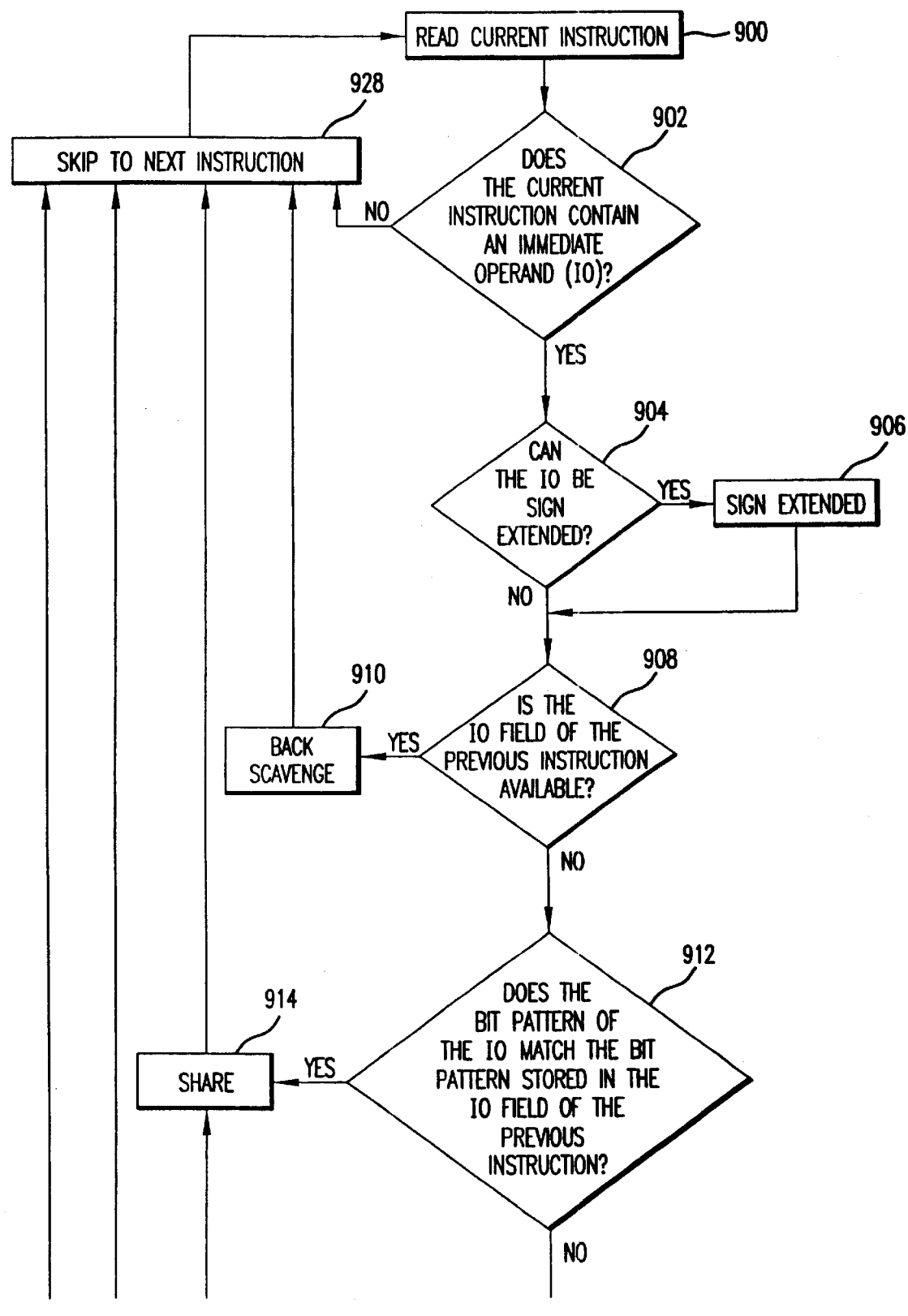
FIGS. 9A and 9B shows a flow chart of an example process for compressing operands according to the present invention.
Figure 9B:
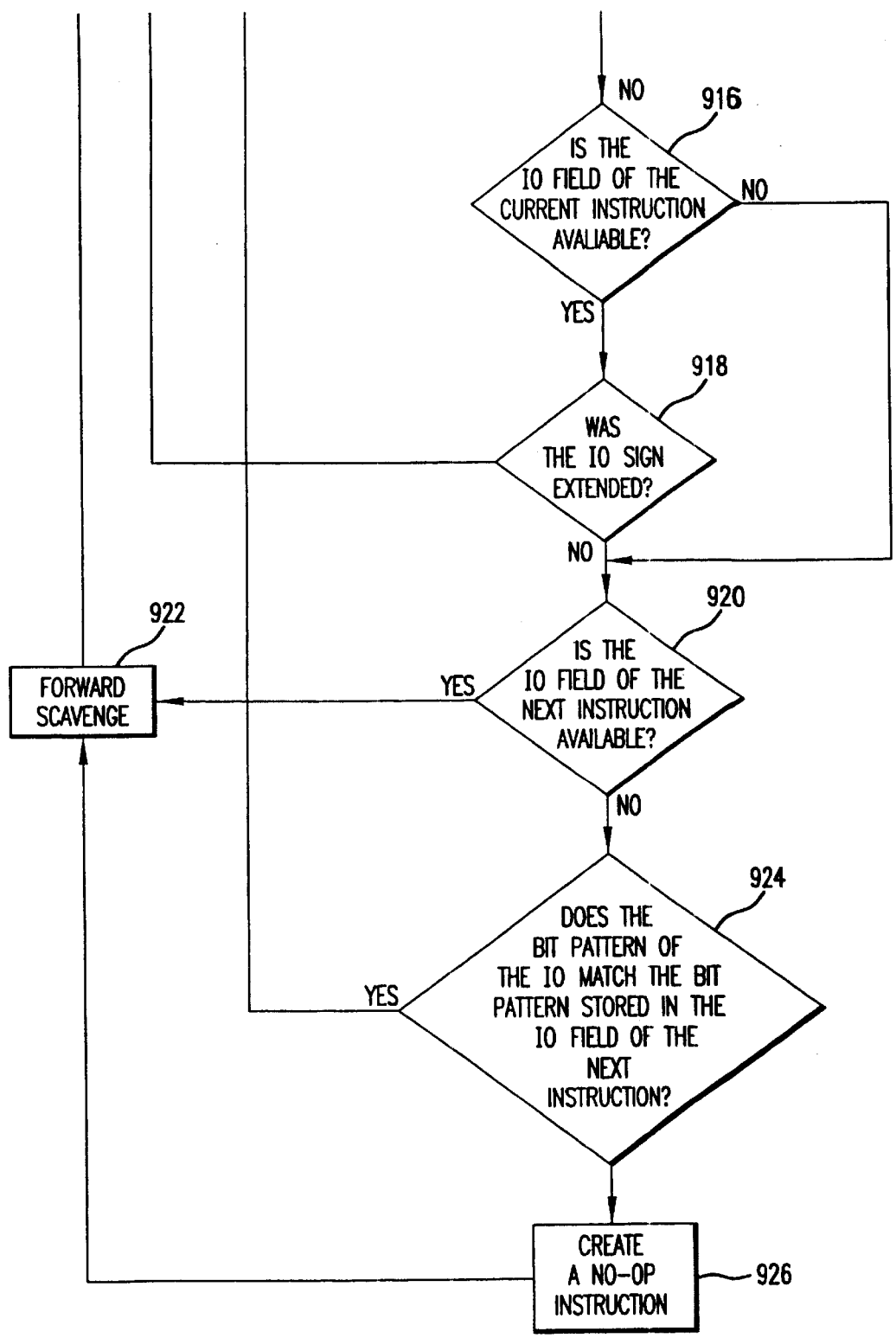

The interaction of the above described compression schemes will be described in connection with the flow chart of FIGS. 9A and 9B. As described above, the example embodiment of the present invention in the flow chart can be implemented at various stages of program processing by software or hardware. The current instruction is read (900) from a storage medium. It is then determined whether the immediate operand field of the current instruction contains an immediate operand (902). If no immediate operand is present, the process skips to the next instruction (928) and then begins the process again with the next instruction. If an immediate operand is present, the process proceeds to determine whether the immediate operand in the immediate operand field can be sign extended to fit into a smaller immediate operand field (904). If the sign extension is possible, the process performs the sign extension on the immediate operand (906).

The process then determines whether the immediate operand field of the previous instruction is available (908). The purpose of determining whether the immediate operand field of the previous instruction is available first is that it may be desirable that the immediate operand for the present instruction be stored in the previous instruction rather than the next instruction. This is because the immediate operand field of the previous instruction is empty, the only immediate operand that can be used to fill that field is the immediate operand in the current instruction. If the current instruction does not store the immediate operand in the empty immediate operand field of the previous instruction, that space will remain empty. In the case of an empty immediate operand field of the next instruction, that field may be filled with an immediate operand from both the current instruction or the instruction immediately subsequent to the next instruction. Therefore, an efficient use of the immediate operand fields may be to allow that field of the next instruction to remain empty for later use, unless the field in both the previous and current instruction are filled. A method of compression may be the technique that stores the immediate operand in the previous instruction, then the current instruction, and lastly in the next instruction. Thus, if the immediate operand field of the previous instruction is available, the process proceeds to for back scavenging of the immediate operand of the current instruction is performed (910). This back scavenging could be either true back scavenging, described above, where the immediate operand is split and a portion stored in the immediate operand field of the previous instruction and a portion stored in the immediate operand field of the current instruction or a combination of sign extension/back scavenging, also described above, where the entire immediate operand for the current instruction is stored in the immediate operand field of the previous instruction.

If the immediate operand field of the previous instruction is not available, the process determines whether the bit pattern stored in the immediate operand field of the previous instruction matches the bit pattern or a portion of the bit pattern of the immediate operand of the current instruction (912). If these bit patterns match, the immediate operand stored in the immediate operand field of the previous instruction can be shared by the current instruction and the previous instruction (914). If these bit patterns do not match, the process determines whether the immediate operand field of the current instruction is available (916). The immediate operand field of the current instruction may become unavailable, for example, if it was used for the purpose of forward scavenging the immediate operand of the previous instruction. If the immediate operand field is available, the process determines whether sign extension had been previously performed on the immediate operand of the current instruction (918). If sign extension had occurred, the immediate operand could be stored in the immediate operand field of the current instruction, therefore processing of this instruction is complete and the process can skip to the next instruction to begin the process for the next instruction (928). If sign extension had not been performed on the immediate operand it would remain too large to fit into the smaller immediate operand field of the current instruction or if the immediate operand field of the current instruction is unavailable (916) the process proceeds (920).

Next, it is determined whether the immediate operand field of the next instruction is available or can be made available through one of the compression techniques to be performed on the immediate operand of the next instruction (920). If the immediate operand field of the next instruction is available or can be made available, forward scavenging of the immediate operand of the current instruction is performed (922). This forward scavenging could be either true forward scavenging, described above, where the immediate operand is split and a portion stored in the immediate operand field of the current instruction and a portion stored in the immediate operand field of the next instruction or a combination of sign extension/forward scavenging, where the entire immediate operand for the current instruction is stored in the immediate operand field of the next instruction.

If the immediate operand field of the next instruction is not available and cannot be made available, the process determines whether the bit pattern stored in the immediate operand field of the next instruction matches the bit pattern or a portion of the bit pattern of the immediate operand of the current instruction (924). If these bit patterns match, the immediate operand stored in the immediate operand field of the next instruction can be shared by the current instruction and the next instruction (914).

If these bit patterns do not match, a blank instruction or a no-op instruction may be inserted (926). This signifies that a new instruction is created which does not contain an opcode, but is an instruction created solely for the purpose of creating an extra immediate operand field in the rare case that the compression techniques are not sufficient to compress the immediate operands into corresponding instructions. After the no-op instruction is created, forward scavenging of the immediate operand of the current instruction is performed (922). This forward scavenging, as described above, could be either split the immediate operand and store a portion in the immediate operand field of the current instruction and store a portion in the immediate operand field of the no-op instruction or store the entire immediate operand for the current instruction in the immediate operand field of the no-op instruction. Creating a no-op instruction is rare because, as stated above, it is more common for an instruction to not contain an immediate operand than to contain an immediate operand. Therefore in the normal case, there are a sufficient number of empty immediate operand fields to accommodate the compression of those instructions that contain immediate operands. As can be seen from FIG. 9, when the compression is completed (910, 914 and 922), the process advances and skips to the next instruction and begins the process agin with the next instruction (928).

Figure 10:
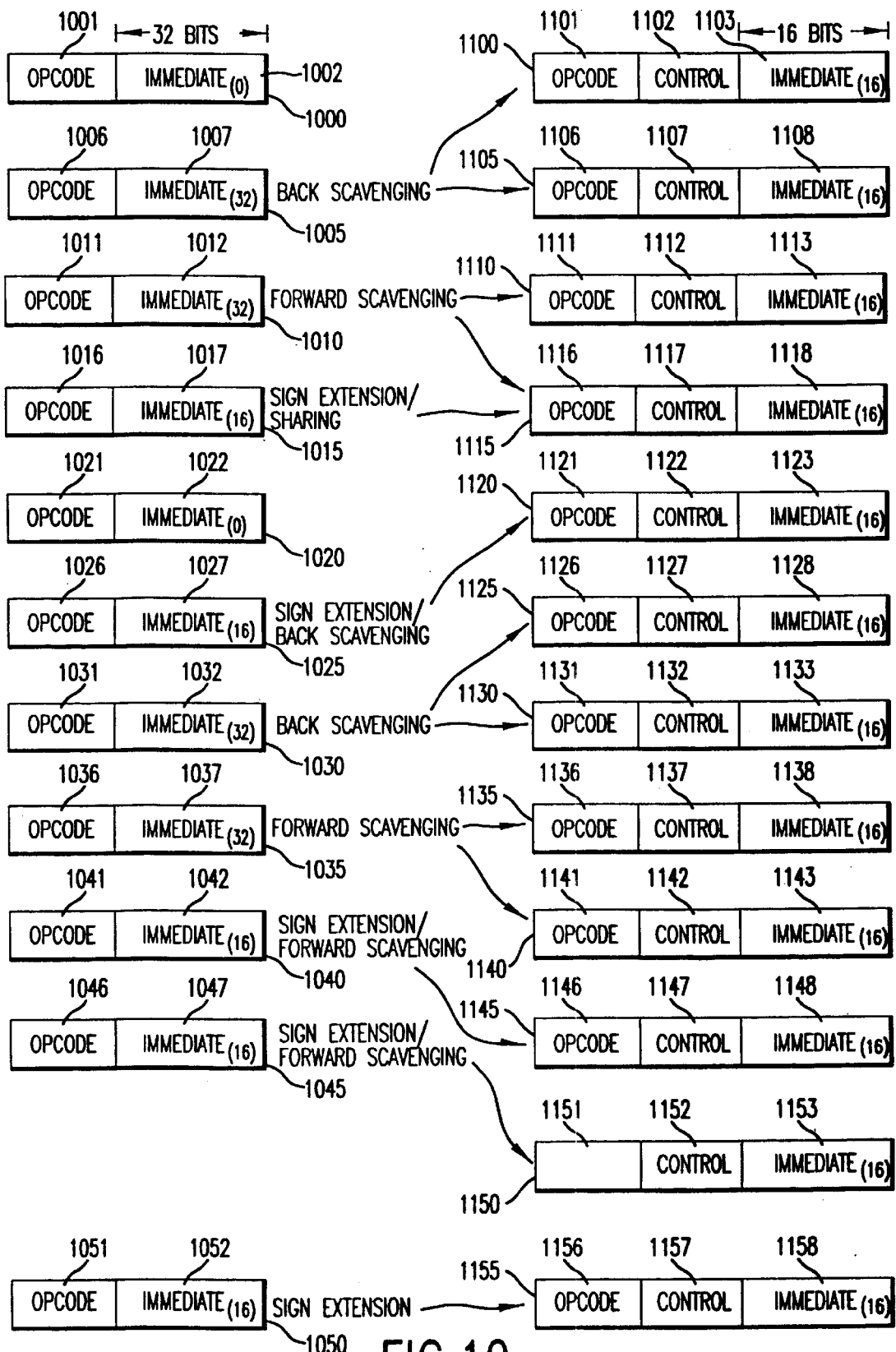
FIG. 10 shows an example compression of a program using the compression schemes of the present invention.

FIG. 10 shows an example portion of a program containing eleven instructions 1000–1050 in the format described with respect to FIG. 1, including opcode fields 1001–1051 and immediate operand fields 1002–1052. These instructions are reformatted using the various compression techniques described above using the process described with respect to the flow chart in FIGS. 9A and 9B, into instructions 1100–1155 which are in the format of FIG. 2, including opcode fields 1101–1156, control fields 1102–1157, and immediate operand fields 1103–1158. Each of instructions 1000–1050 have a fixed number of bits allocated to the opcode fields 1001–1051 and a fixed number of bits allocated to the immediate operand fields 1002–1052. In this example, the immediate operand 1002–1052 are shown as a fixed 32 bits based upon the fact that 32 bits is the maximum immediate operand any individual instruction is expected to store. Each of instructions 1000–1050 shows the number of significant bits needed to represent the immediate operand stored in the immediate operand field for that instruction. Instructions 1005, 1010, 1030, and 1035 employ 32 bits to represent their immediate operand, instructions 1015, 1025, 1040, 1045 and 1050 employ 16 bits to represent their immediate operand, and instructions 1000 and 1020 do not have any immediate operands. Again, the bit lengths in FIG. 10 were chosen to illustrate the present invention, however the present invention can be implemented independent of the number of bits allocated to the immediate operand field or the number of significant bits employed to represent any individual immediate operand.

Instructions 1100–1155 are in the example instruction format according to the present invention. Each of instructions 1100–1155 have a fixed number of bits allocated to the opcode fields 1101–1156, a fixed number of bits allocated to the control fields 1102–1157 and a fixed number of bits allocated to the immediate operand fields 1103–1158. In this example, the fixed number of bits allocated to the immediate operand fields 1103–1158 is 16 bits, half the number allocated to the immediate operand fields 1002–1052 for instructions 1000–1050. The column between the two sets of instructions shows the compression techniques used to compress the immediate operand of instructions 1000–1050 into the immediate operand fields 1103–1158 of instructions 1100–1155.

Instruction 1000 had no immediate operand and employs no compression for reformatting into instruction 1100. Thus, the process can advance to the next instruction (902 of FIG. 9). Instruction 1005 has an immediate operand employing 32 bits, therefore compression of the immediate operand is employed for formatting into instruction 1105. In this case, the immediate operand cannot be sign extended (904 and 906 of FIG. 9), but the immediate operand field 1103 of instruction 1100 is available for back scavenging (908 and 910 of FIG. 9). Thus, 16 bits of the immediate operand of instruction 1105 is stored in the immediate operand field 1103 of the previous instruction 1100 and 16 bits are stored in the immediate operand field 1108 of the current instruction 1105.

Instruction 1010 has an immediate operand employing 32 bits, therefore compression of the immediate operand is employed for formatting into instruction 1110. In this case, the immediate operand cannot be sign extended (904 and 906 of FIG. 9), the immediate operand field 1108 of instruction 1105 is not available for back scavenging (908 and 910 of FIG. 9), and the bit pattern of the immediate operand does not match that of instruction 1105 (912 of FIG. 9). However, the immediate operand field 1113 of the current instruction 1110 is available (916 of FIG. 9) and the immediate operand field 1118 of the next instruction 1115 is also available (920 of FIG. 9). Therefore, forward scavenging (922 of FIG. 9) can be used to compress the immediate operand of instruction 1110. Thus, 16 bits of the immediate operand of instruction 1110 is stored in the immediate operand field 1113 of the current instruction 1110 and 16 bits are stored in the immediate operand field 1118 of the next instruction 1115.

As can be seen from FIG. 10, the remainder of the instructions are reformatted into the format of FIG. 2 in the same manner, following the process described with respect to FIG. 9. Instruction 1015 is reformatted into instruction 1115 using sign extension/sharing. Instruction 1020 does not employ any compression to be reformatted into instruction 1120. Instruction 1025 is reformatted into instruction 1125 using sign extension/back scavenging. Instruction 1030 is reformatted into instruction 1130 using back scavenging. Instruction 1035 is reformatted into instruction 1135 using forward scavenging. Instruction 1040 is reformatted into instruction 1140 using sign extension/forward scavenging.

Instruction 1045 has an immediate operand employing 16 bits, therefore compression of the immediate operand is employed for formatting into instruction 1145. In this case, the immediate operand can be sign extended (904 and 906 of FIG. 9), but none of the immediate operand fields 1143, 1148, 1158 of previous instruction 1140, the current instruction 1145 or the next instruction 1155, respectively, are available to store the immediate operand. In this case, a no-op instruction 1150 is inserted (924 of FIG. 9). Thus, by forward scavenging the immediate operand of instruction 1145 can be stored in the immediate operand field 1153 of no-op instruction 1150. Finally, instruction 1050 is reformatted into instruction 1155 using sign extension.

Other Embodiments: While the present invention has been particularly shown and described with reference to an example embodiment, in particular the above examples of showing the various compression techniques for the immediate operand using immediate operand bit lengths of 32 and 16 bits, but it will be understood by those skilled in the art that various changes in form and details may be made therein without departing from the spirit and scope of the invention.

What is claimed is:

1. An article, comprising an instruction stored on a storage medium, the instruction including fields for:

an opcode;

operand data, the operand data being compressed prior to being stored in the instruction on the storage medium, wherein compressed operand data is a first number of bits and uncompressed operand data is a second number of bits, and wherein the first number of bits is less than the second number of bits; and a control code, separate from the opcode, specifying which of a plurality of compression techniques is associated with the operand data.

2. The article according to claim 1, wherein the first number of bits is one half the second number of bits.

3. The article according to claim 1, wherein the instruction has a predetermined bit length.

4. A method for storing an operand in at least one of a plurality of program instructions, comprising:

allocating a fixed number of bits in each of the plurality of program instructions for storing the operand, wherein the plurality of program instructions includes a current instruction and a previous instruction;

compressing the operand;

splitting the compressed operand into a first portion and a second portion;

storing one of the first portion and the second portion in the fixed number of bits of the previous instruction; and storing the other one of the first portion and the second portion in the fixed number of bits of the current instruction.

5. A method for storing an operand in at least one of a plurality of program instructions, comprising:

allocating a fixed number of bits in each of the plurality of program instructions for storing the operand, wherein the plurality of program instructions includes a current instruction and a next instruction;

compressing the operand;

splitting the compressed operand into a first portion and a second portion;

storing one of the first portion and the second portion in the fixed number of bits of the current instruction; and storing the other one of the first portion and the second portion of the operand in the fixed number of bits of the next instruction.

6. A method for storing an operand in at least one of a plurality of program instructions, comprising:

allocating a fixed number of bits in each of the plurality of program instructions for storing the operand, wherein the plurality of program instructions comprises a previous instruction, a current instruction, and a next instruction;

compressing the operand; and storing the compressed operand in the fixed number of bits in a selected one of the previous instruction, the current instruction, and the next instruction, wherein the selected one is:

the previous instruction if the fixed number of bits of the previous instruction is available;

the current instruction if the fixed number of bits of the previous instruction is unavailable; and the next instruction if the fixed number of bits of the previous instruction is unavailable and the fixed number of bits of the current instruction is unavailable.

7. A method for storing an operand in at least one of a plurality of program instructions, comprising:

allocating a fixed number of bits in each of the plurality of program instructions for storing the operand, wherein the plurality of program instructions comprise a current instruction and a previous instruction;

compressing the operand of the current instruction;

determining if a bit pattern of the compressed operand of the current instruction is identical to a bit pattern of a compressed operand stored in the previous instruction; and indicating, if the bit patterns are identical, that the compressed operand stored in the previous instruction is shared with the current instruction and the previous instruction.

8. The method according to claim 6, further comprising:

inserting a new instruction if the fixed number of bits of each of the previous instruction, the current instruction, and the next instruction is unavailable.

* * * * *